US007685601B2

(12) United States Patent
Iwamoto

(10) Patent No.: US 7,685,601 B2
(45) Date of Patent: Mar. 23, 2010

(54) METHODS AND APPARATUS FOR SEGMENTED STACK MANAGEMENT IN A PROCESSOR SYSTEM

(75) Inventor: Tatsuya Iwamoto, Foster City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 189 days.

(21) Appl. No.: 11/068,242

(22) Filed: Feb. 28, 2005

(65) Prior Publication Data
US 2006/0195824 A1    Aug. 31, 2006

(51) Int. Cl.
G06F 12/02 (2006.01)
(52) U.S. Cl. .................. 718/108; 711/132; 711/170
(58) Field of Classification Search .......... 711/170; 712/202
See application file for complete search history.

(56) References Cited

U.S. PATENT DOCUMENTS

| 5,835,958 | A  | * | 11/1998 | Long et al. ............. 711/170 |
| 5,995,752 | A  | * | 11/1999 | Chao et al. ............. 717/114 |
| 6,006,323 | A  | * | 12/1999 | Ma et al. ............... 712/202 |
| 6,119,206 | A  | * | 9/2000  | Tatkar et al. ........... 711/147 |
| 6,438,677 | B1 | * | 8/2002  | Chaudhry et al. ......... 712/27 |
| 6,526,491 | B2 |   | 2/2003  | Suzuoki et al. |
| 6,990,567 | B1 | * | 1/2006  | Cohen et al. ............ 712/202 |
| 2003/0110200 | A1 |   | 6/2003 | Kramskoy |
| 2004/0193828 | A1 | * | 9/2004 | Nevill .................. 711/170 |

FOREIGN PATENT DOCUMENTS

| EP | 0 840 210 A2 | 5/1998 |
| JP | 10232785    | 9/1998 |

OTHER PUBLICATIONS

"Automatically Extensible Discontiguous Stacks"; IBM Technical Disclosure Bulletin; vol. 39, No. 2, Feb. 1996, pp. 307-313.*
Walker, Robert A. et al.; "Implementing Associative Processing: Rethinking Earlier Architectural Decisions." Proceedings 15th International Parallel and Distributed Processing Symposium; Apr. 23-27, 2001; pp. 2092-2100, (9 pages).*
European Search Report based on EP Application No. 06003943.5-2211, dated Jun. 22, 2006.
Japanese Office Action for Corresponding patent application JP 2006-050358 dated May 20, 2008.

* cited by examiner

Primary Examiner—Gary J Portka
(74) Attorney, Agent, or Firm—Matthew B. Dernier, Esq.; Gibson & Dernier LLP

(57) ABSTRACT

Methods and apparatus provide for allocating a first stack module in response to a first function call of a software program running on a processing system; and allocating a second stack module in response to a second function call of the software program, wherein the second stack module is non-contiguous with respect to the first stack module.

38 Claims, 11 Drawing Sheets

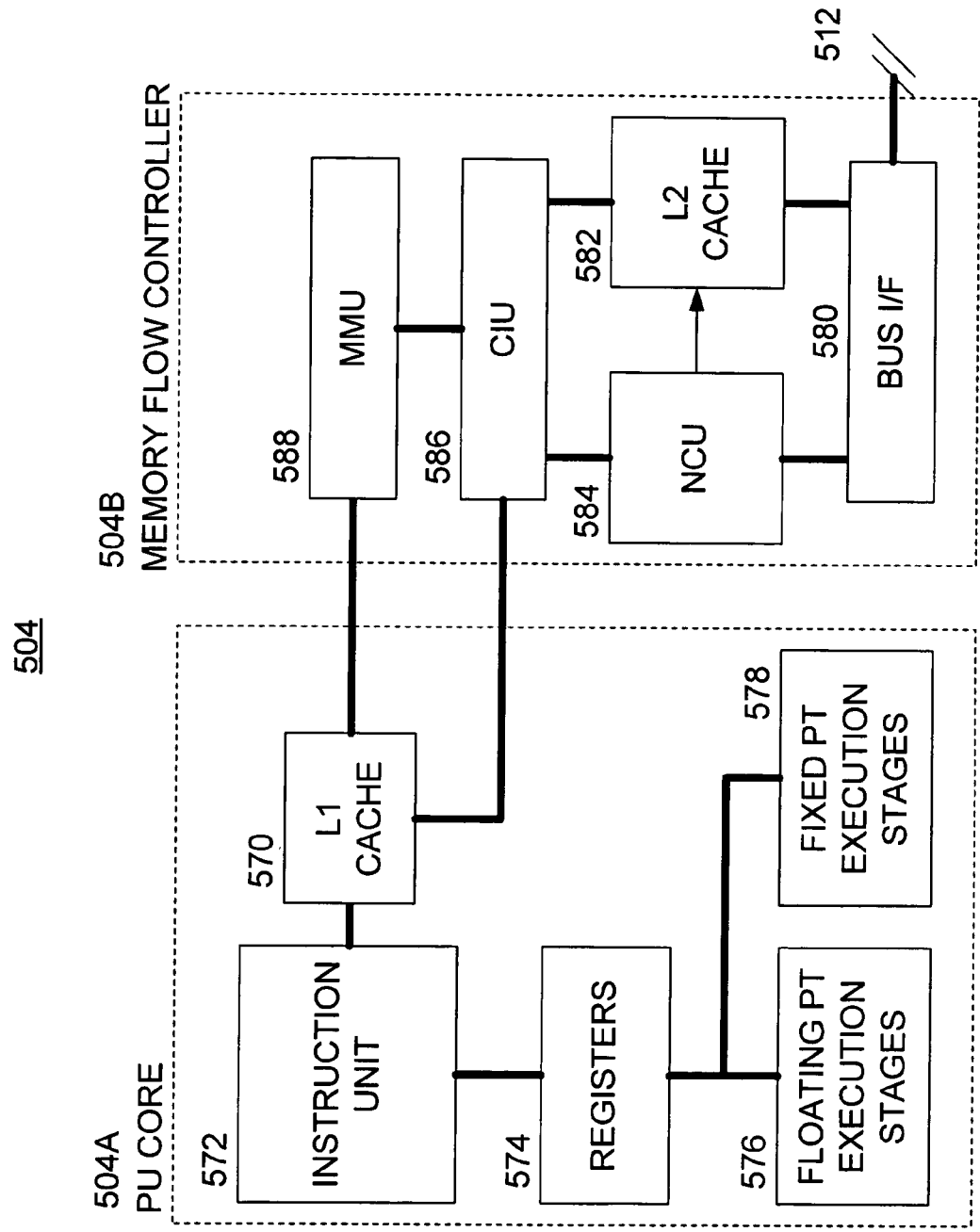

US 7,685,601 B2

METHODS AND APPARATUS FOR SEGMENTED STACK MANAGEMENT IN A PROCESSOR SYSTEM

BACKGROUND

The present invention relates to methods and apparatus for transferring data within a multi-processing system.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

A significant part of a processing system is the formation and management of the stack. In a conventional processing system, a stack frame is formed in memory to store program information when a function call is made. A typical stack frame includes a general register save area, a local variable save area, a parameter list area, a link register save area and a back chain save area. The general register save area is used to store the data of the calling function contained in the general registers of the processing system. The local variable save area is used to store the variable data of the calling function contained in memory of the processing system. The parameter list area is used to store data of the calling function that is to be passed to the called function. The link register save area is used to store the value of the link register so that the return address may be re-established when the calling function is completed. The back chain save area is used to store a pointer value to the back chain of a prior stack frame.

The problem with the conventional approach to managing the stack in the conventional processing system is that the stack can grow significantly and take up valuable space in the memory of the processing system. In processing systems having relatively small local memories, the uncontrolled growth of the stack may be problematic. Conventional stack allocation techniques employing memory management hardware can start with a small stack space and add pages when the stack outgrows the stack space. Although these techniques permit freeing inactive pages of the stack, they cannot control the growth of the total address space consumed by all the stack modules.

SUMMARY OF THE INVENTION

One or more aspects of the invention may provide for allocating more than one stack module (or dividing the stack) in accordance with one or more parameters of an application program running on the processing system. For example, separate stack modules may be formed for each function call, for each .text module, or for groups of .text modules of the program. The advantages of having multiple stack modules include the ability to delete stack modules that are no longer needed and/or the movement of stack modules to other memories (such as a larger system memory) in order to free up memory space in the local memory of the processing system.

A stack frame may be split along a line that divides the data associated with the calling function and the data associated with the callee function. For example, the general register save area and the local variable save area are associated with the calling function, while the parameter list area, the link register save area and the back chain save area are associated with the callee function. Thus, splitting the stack frame between the local variable save area and the parameter list area may be performed to establish a basis for two separate stack modules. Information concerning the location of the program module and the stack module associated with the calling function may be saved in the new stack module for the callee function.

One or more embodiments of the present invention may provide for: allocating a first stack module in response to a first function call of a software program running on a processing system; and allocating a second stack module in response to a second function call of the software program, wherein the second stack module is non-contiguous with respect to the first stack module. The first function call preferably calls the second function call.

One or more further aspects of the present invention may include allocating a non-contiguous stack module containing a single stack frame in response to each function call of the software program made by another function call.

One or more further aspects of the present invention may include allocating the second stack module in response to the first function call calling the second function call when: the software program includes a plurality of executable program modules, the first function call is part of a first program module, and the second function call is part of a second program module. Preferably, the first stack module is used and the second stack module is not allocated in response to the first function call calling the second function call when: the first and second function calls are part of the same program module.

One or more further aspects of the present invention may include allocating the second stack module in response to the first function call calling the second function call when: the software program includes a plurality of executable program modules, the program modules are grouped into a plurality of program module sets, the first function call is part of a program module in a first program module set, and the second function call is part of a program module in a second program module set. One or more further aspects of the present invention may include using the first stack module and not allocating the second stack module in response to the first function call calling the second function call when: the first and second function calls are part of the same program module set.

One or more embodiments of the present invention may provide for: allocating a first stack frame in response to a first function call of a software program running on a processing system; allocating a second stack frame in response to the first function call calling a second function call of the software program; and dividing the second stack frame into areas for the first function call and areas for the second function call.

The second stack frame may include at least one of: (i) a general register area operable to save one or more register values produced during the first function call, (ii) a local variable area operable to save one or more variable values produced during the first function call, (iii) a parameter list area operable to save one or more parameter values produced during the first function call for use by the second function call, (iv) a link register save area operable to save the link register value for use by the first function call in returning to a portion of the program being executed when the first function call was invoked, and (v) a back chain area operable to save a pointer to a back chain area of the first stack frame.

Dividing the second stack frame preferably includes dividing at least one of the general register area and the local variable area for the first function call from at least one of the parameter list area, the link register save area, and the back chain area for the second function call.

One or more embodiments of the present invention may provide for: allocating a first stack module in response to a first function call of a software program running on a processing system; allocating a second stack module in response to the first function call calling a second function call of the software program; storing the second stack module non-contiguously with respect to the first stack module; and deleting the second stack module in response to returning from the second function call to the first function call.

One or more embodiments of the present invention may provide for: allocating a first stack module in response to a first function call of a software program running on a processing system; allocating a second stack module in response to the first function call calling the second function call; adding to the second stack module, return information as to the address of the first stack module in a memory of the processing system; and storing the second stack module non-contiguously with respect to the first stack module.

One or more further aspects of the present invention may include: using the return information of the second stack module by the second function call to at least one of verify the location of and load the first stack module in the memory; and returning from the second function call to the first function call. One or more further aspects of the present invention may include: allocating the second stack module when: the software program includes a plurality of executable program modules, the first function call is part of a first program module, and the second function call is part of a second program module.

One or more further aspects of the present invention may include: deleting the second stack module; and/or storing the second stack module in a separate memory from the first stack module.

One or more embodiments of the present invention may provide for a storage medium containing a software program, the software program being operable to cause a processor of a processing system to execute actions including: allocating a first stack module in response to a first function call of a software program running on a processing system; allocating a second stack module in response to the first function call calling a second function call of the software program; and storing the second stack module in a non-contiguous relationship with respect to the first stack module.

One or more further aspects of the software program may provide for: allocating a non-contiguous stack module containing a single stack frame in response to each function call of the software program made by another function call; allocating the second stack module in response to the first function call calling the second function call when: the software program includes a plurality of executable program modules, the first function call is part of a first program module, and the second function call is part of a second program module; and allocating the second stack module in response to the first function call calling the second function call when: the program modules are grouped into a plurality of program module sets, the first function call is part of a program module in a first program module set, and the second function call is part of a program module in a second program module set.

One or more embodiments of the present invention may provide for an apparatus, comprising: at least one processor capable of operative communication with a main memory; and a local memory coupled to the at least one processor, wherein the at least one processor is operable to: (i) allocate a first stack module in the local memory in response to a first function call of a software program, (ii) allocate a second stack module in response to the first function call calling a second function call of the software program, and (iii) store the second stack module in a non-contiguous relationship with respect to the first stack module in the local memory.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 11 is a diagram illustrating the structure of an exemplary processing unit (PU) of the system of FIG. 9 that may be adapted in accordance with one or more further aspects of the present invention.

DETAILED DESCRIPTION OF THE PRESENT INVENTION

Figure 1:
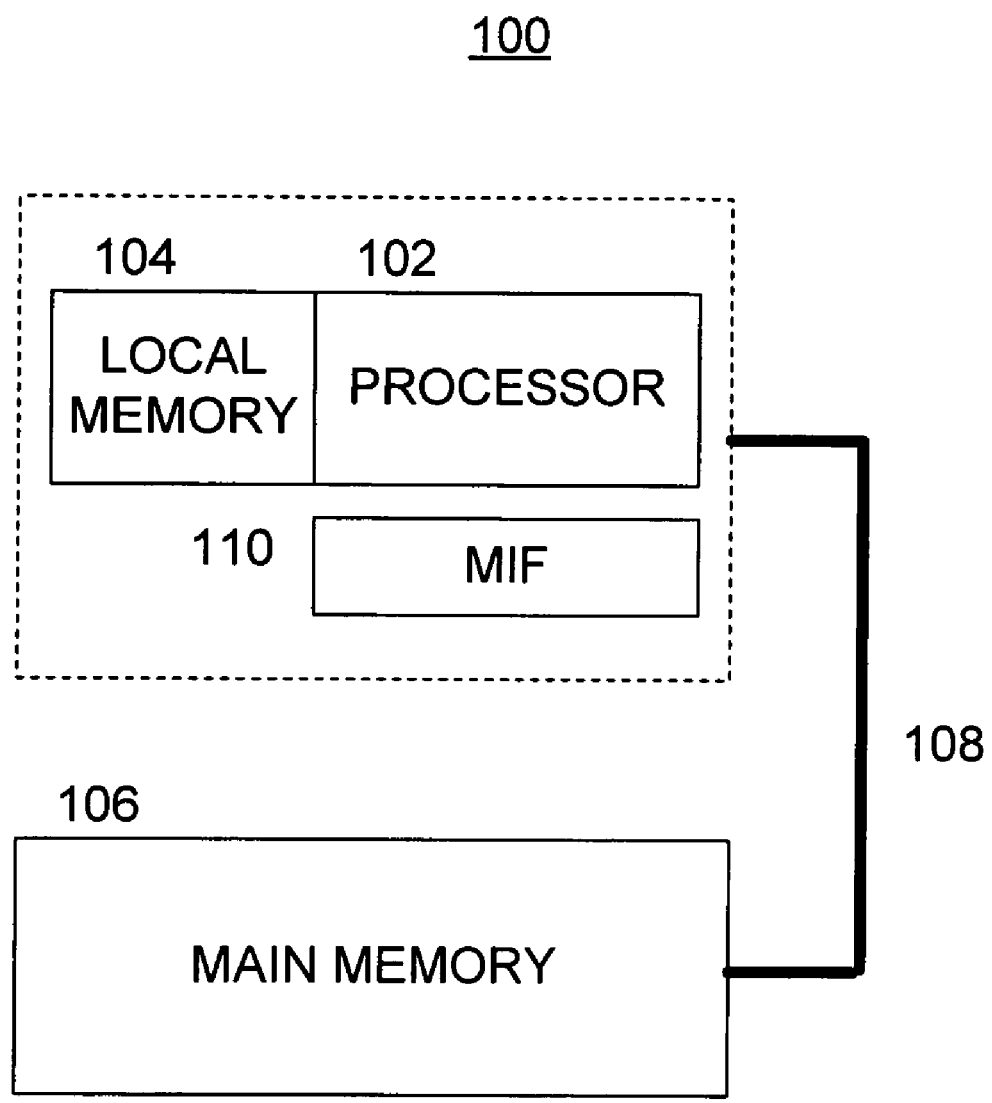
FIG. 1 is a diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The apparatus 100 preferably includes a processor 102, a local memory 104, a main memory 106 (e.g., a DRAM), and a bus 108. The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

The local memory 104 is located in proximity to the processor 102 such that the processor may execute program code and otherwise manipulate data within the local memory 104 as opposed to the system memory 106. The local memory 104 is preferably not a traditional hardware cache memory in that there are preferably no on chip or off chip hardware cache circuits, cache registers, cache memory controllers, etc. to implement a hardware cache memory function. As on-chip space may be limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access is preferably implemented utilizing a direct memory access controller DMAC within the memory interface 110.

Figure 2:
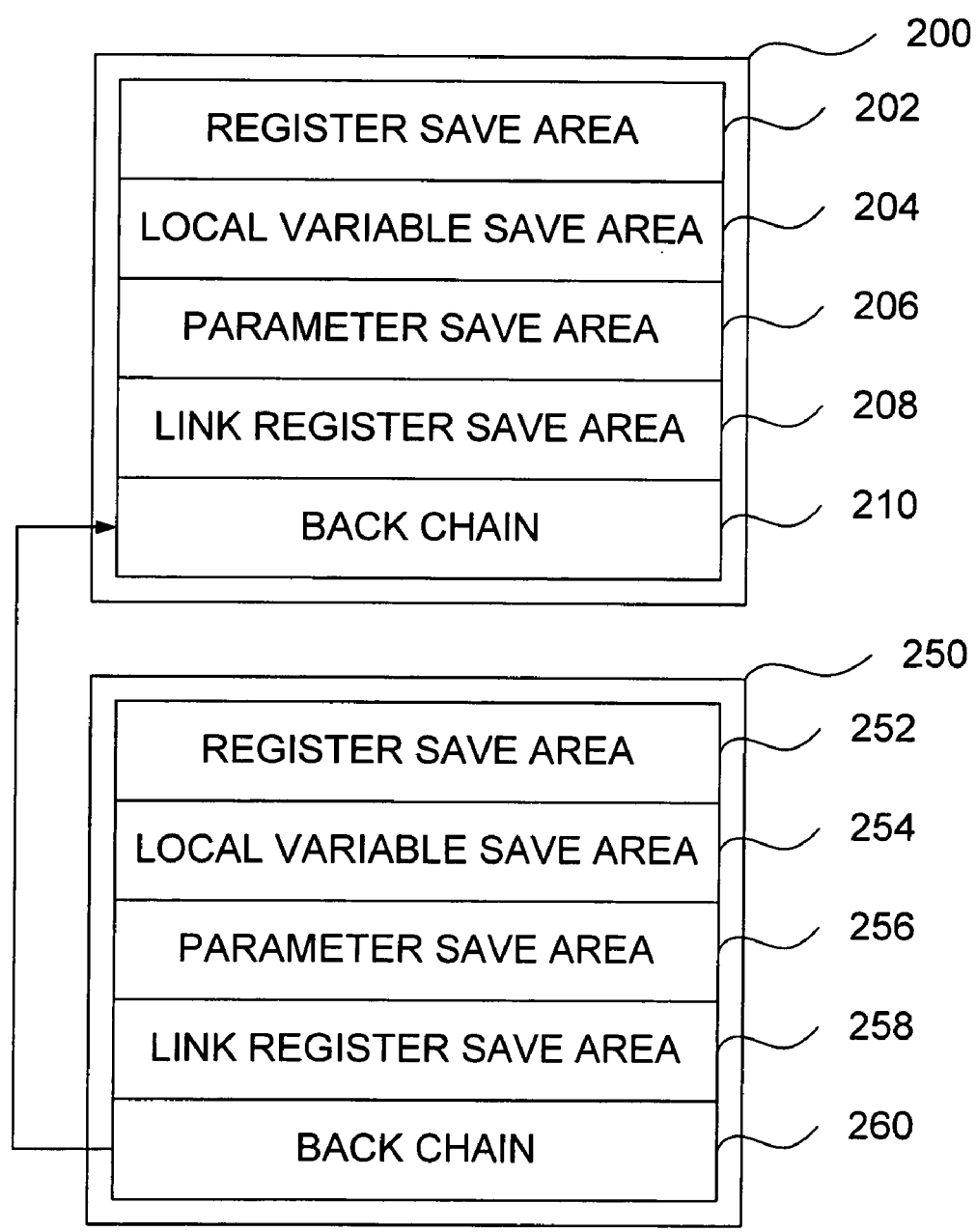
FIG. 2 is a diagram illustrating two stack frames that may be employed by the processing system of FIG. 1.

With reference to FIG. 2, the processing system 100 may utilize a stack. The stack is a data area or buffer used to store information that needs to be processed or handled later in a program in order to service other program code. For example, when the program code being executed on the processing system 100 encounters a function call indicating a branch to another portion of the program, certain information presently being processed and/or utilized by the program is pushed onto the stack so that it may be recalled later, after the function call is completed. A stack is generally a push-down list, meaning that as new information is pushed onto the stack, the old information is pushed downward on the stack. The program takes items off of the stack on a last-in-first-out basis.

The stack may include one or more stack frames 200, 250, it being understood that only two stack frames are shown for purposes of illustration. The first stack frame 200 may include a general register area 202 operable to save one or more register values produced during a particular portion of the program, such as a first function call. When the call to the subsequent function is completed, these register values may be pulled off the stack such that the original portion of the program (such as the first function call) may be completed. The first stack frame 200 may also include a local variable area 204 operable to save one or more variable values produced during the first function call. When the call to the subsequent function is completed, these variable values may be pulled off the stack such that the original portion of the program may be completed.

The first stack frame 200 may also include a parameter list area 206 operable to save one or more parameter values produced during the first function call for use by a subsequent function call, such as a second function call. The parameters are passed to the second function call by way of pulling the data off of the stack for use in the second function call. The first stack frame 200 may also include a link register save area 208 operable to save the link register value for use by the first function call in returning to a portion of the program being executed when the first function call was invoked. The first stack frame 200 may also include a back chain area 210 operable to save a pointer to a back chain area of a previous stack frame.

The second stack frame 250 may include a similar set of areas as the first stack frame 200. Notably, the back chain 260 of the second stack frame 250 includes a pointer to the back chain area 210 of the first stack frame 200.

It is noted that the above discussion assumed that the stack is used by way of the call-by-value technique in which actual data are pushed onto the stack. It is noted that the stack may also be implemented using the call-by-reference technique in which pointers to the data are pushed onto the stack instead of the data itself. Thus, as used herein any discussion of putting data onto the stack or otherwise using the stack contemplates both the call-by-value and call-by-reference techniques.

In general, a calling function creates a stack frame when that function calls a subsequent function, a callee function. For example, assuming that the first stack frame 200 was created by the program running on the processing system 100 calling a first function, a call to a second function may produce the second stack frame 250. When the second function is called by the first function, the value of the link register is stored in the link registered save area 258 of the second stack frame 250. The link register stores the return address associated with the program when a function is invoked. The link register will be updated with a new return address associated with the calling function, such that the program may return to the calling function after the callee function is completed. Thus the earlier return address associated with the program when the first function was called needs to be stored on the stack.

Next, the calling function may store data that it had been utilizing onto the stack 250. For example, the values contained in the hardware registers of the processing system 100 may be stored in the register save area 252 and local variables being utilized by the calling function may be stored in the local variable save area 254 of the stack 250. The calling function may store data to be passed to the callee function in the parameter save area 256 such that the callee function may retrieve such data from manipulation and subsequent return (if applicable) to the calling function.

Next, the stack pointer is adjusted to point to the back chain area 260 and the back chain area 260 is adjusted to point to the back chain 210 of the previous stack frame 200. The program may then jump to the callee function, where further processing is carried out, including manipulation of any data stored in the parameter save area 256 of the stack frame 250.

Figure 3:
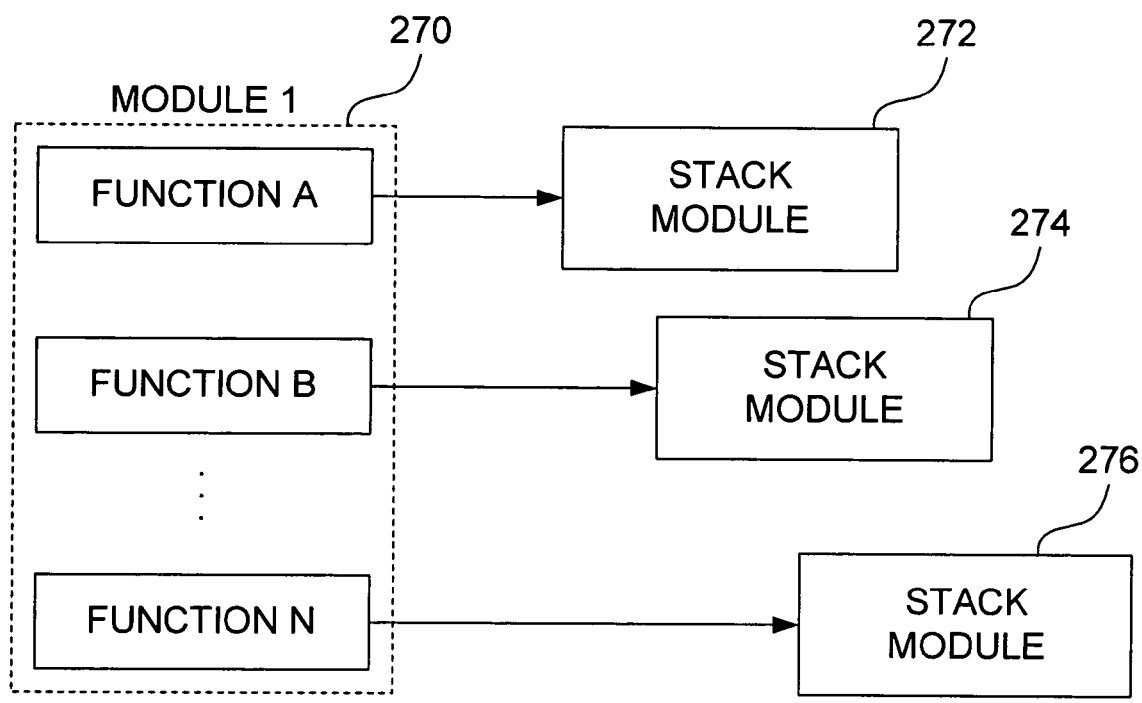
FIG. 3 is a block diagram illustrating that a processing system may employ a plurality of separate stack modules on a function-by-function basis in accordance with one or more aspects of the present invention.

With reference to FIG. 3, the program running on the processing system 100 may include a number of program modules, such as a first module 270. The first module 270 may include a number of functions A, B, . . . N. The processing system 100 is preferably operable to allocate a plurality of separate stack modules (each having one or more stack frames, or even a partial stack frame) on a function-by-function basis. In particular, the processing system 100 is preferably operable to allocate a first stack module, such as stack module 272 in response to calling a first function, such as function A. The processing system 100 is preferably operable to allocate a second stack module, such as stack module 274 in response to calling a second function, such as function B.

The processing system 100 may be operable to allocate an Nth stack module, such as stack module 276 in response to calling an Nth function, such as function N. In keeping with the example hereinabove, function A may be a calling function that calls function B. As implied by the block diagram of FIG. 3, in accordance with one or more aspects of the present invention, a separate stack module containing a single stack frame may be produced in response to each function call of the software program irrespective of whether the functions are part of the same program module or are in separate program modules.

The first and second stack modules 272, 274 are preferably non-contiguous with respect to one another in the local memory 104. Unlike conventional stack management techniques, the stack frame of the stack module 274 associated with function B is not appended to the stack frame of the stack module 272 associated with function A; rather, the stack frames are part of non-contiguous stack modules 272, 274.

Figure 4:
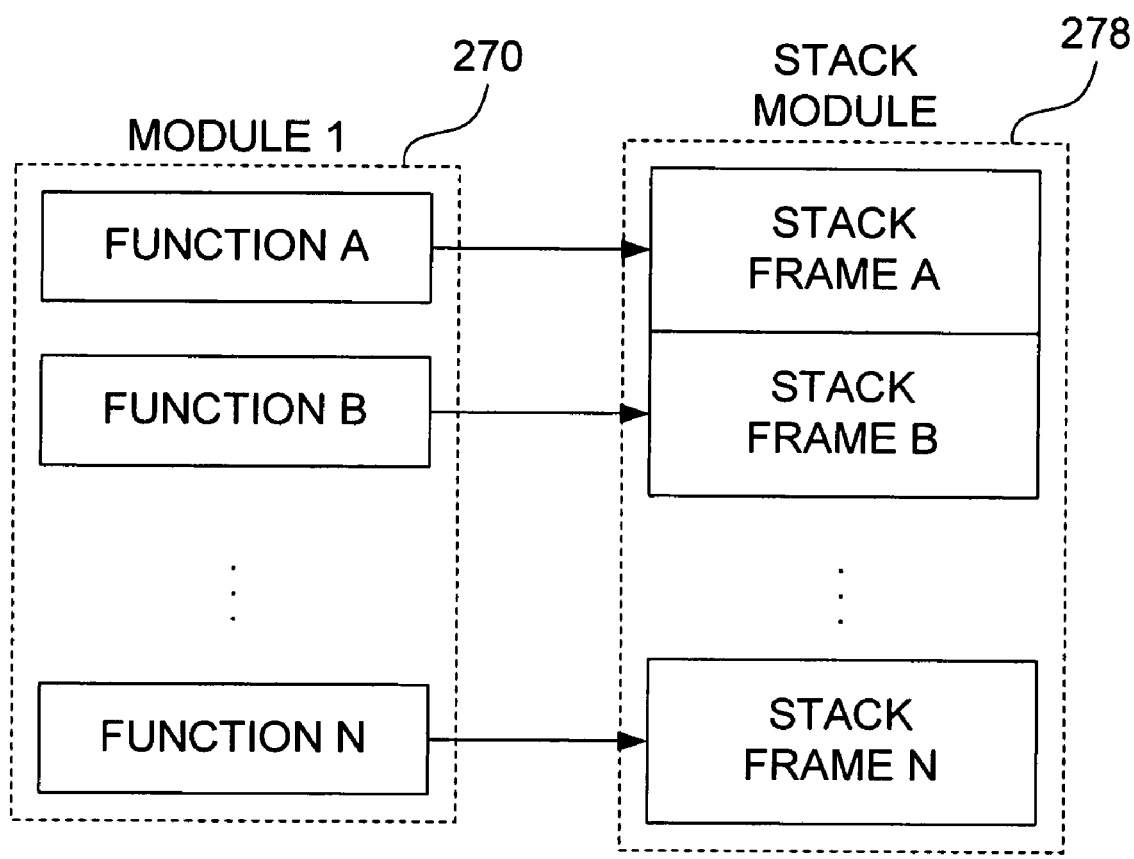
FIG. 4 is a block diagram illustrating that a processing system may employ a plurality of separate stack modules on a module-by-module basis in accordance with one or more aspects of the present invention.

With reference to FIG. 4, and in accordance with one or more further aspects of the present invention, the processing system 100 is preferably operable to allocate a plurality of separate stack modules on a module-by-module basis. In particular, the processing system 100 is preferably operable to allocate a stack module 278 that may include a number of stack frames, such as stack frame A, stack frame B, . . . stack frame N. Each stack frame within the stack module 278 is produced in response to a respective function call from a plurality of functions (A, B, . . . N, respectively) of a single program module 270 of the program being executed on the processing system 100.

A separate stack module (not shown) is preferably allocated when one or more of the functions within the module 270 call a function in a separate program module (not shown) of the program. By way of example, the program modules may correspond with the .text files used to produce the executable program running on the processing system 100. Preferably, a separate stack module is not produced when one of the functions within a single module, such as program module 270, calls another function within the same program module.

Figure 5:
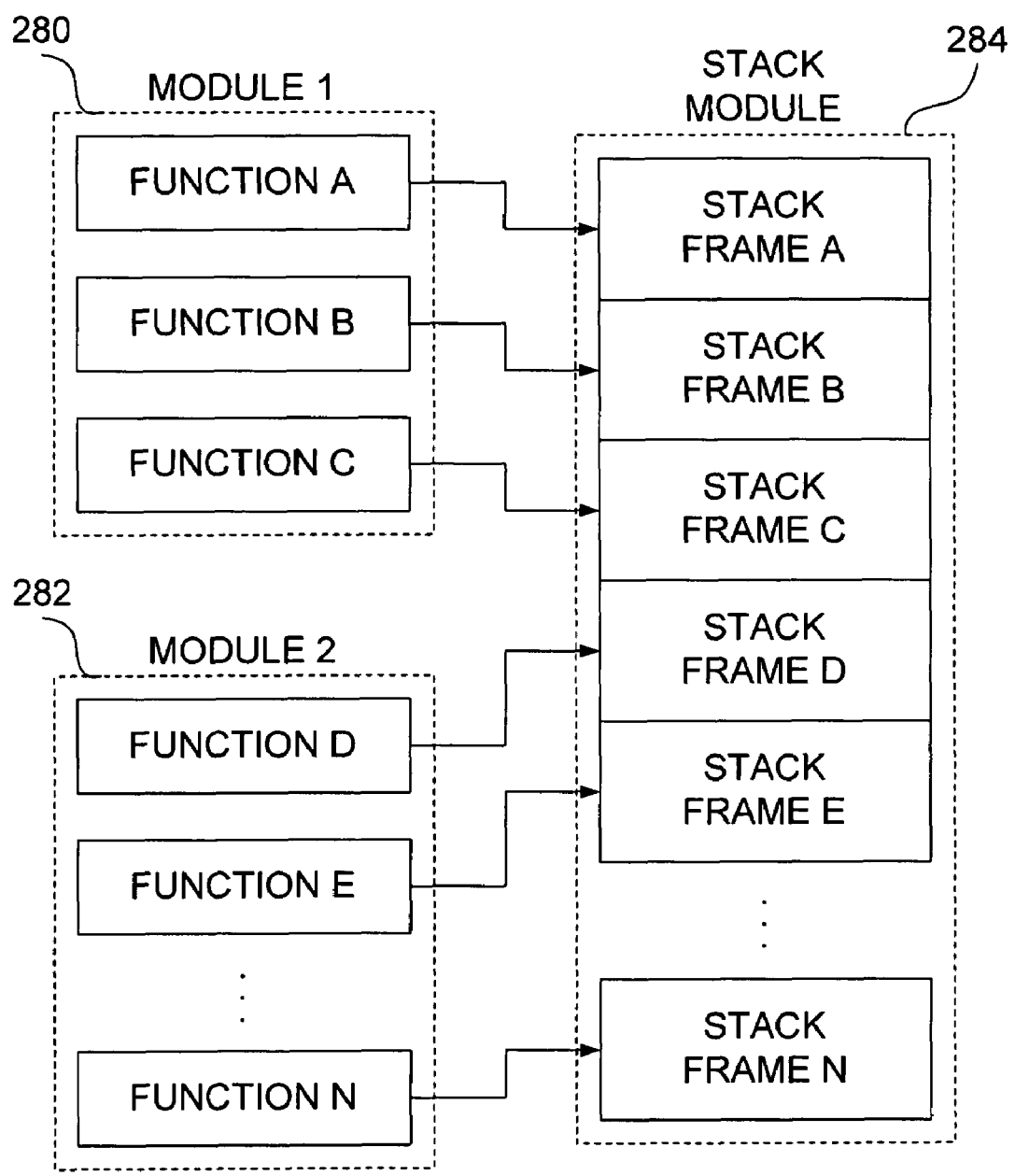
FIG. 5 is a block diagram illustrating that a processing system may employ a plurality of separate stack modules on a multi-module-by-module basis in accordance with one or more aspects of the present invention.

With reference to FIG. 5, and in accordance with one or more further aspects of the present invention, the processing system 100 is preferably operable to allocate a plurality of separate stack modules on a multi-module-by-module basis. In particular, the program running on the processing system 100 may include a plurality of executable program modules 280, 282, etc., where the program modules are grouped into a plurality of program module sets. In FIG. 5, it is assumed the module 280 and the module 282 are within the same set. When any of the functions within the respective modules 280, 282 call another function within the same module set, the resultant stack frame is preferably made a part of the same stack module 284. When one or more of the functions within the same module set calls a function outside the module set, however, another stack module (not shown) is preferably allocated that is separate from the stack module 284.

Irrespective of the particular mode in which a non-contiguous stack module is allocated in response to a function call (e.g., function-by-function, module-by-module, or multi-module-by-module), the stack is preferably divided in order to sever the stack into respective modules. It is preferred that the division of the stack occurs along areas for the calling function and the callee function. For example, assuming that the stack frame 250 is to be divided in order to produce respective stack modules, the fact that the register save area 252 and the local variable save area 254 are associated with the calling function, while the parameter save area 256, the link register save area 258, and the back chain 260 may be associated with the callee function may be exploited. Indeed, the stack frame 250 may be divided such that the parameter save area 256, the link register save area 258, and the back chain 260 may be made part of a separate stack module that may be stored in a non-contiguous area of the local memory 104 in order to achieve some advantageous results.

Figure 6:
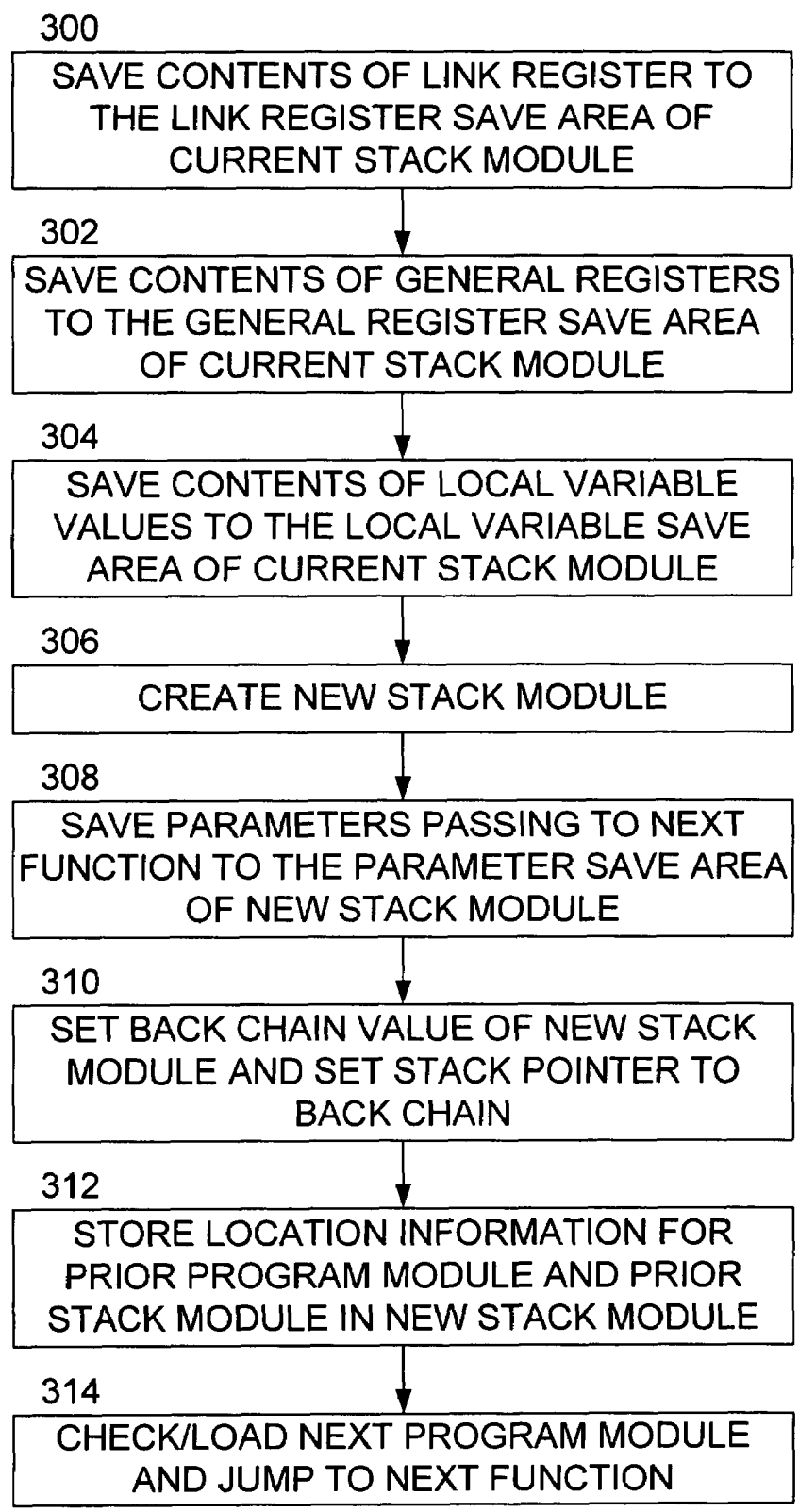
FIG. 6 is a flow diagram illustrating process steps that may be carried out by the processing system of FIG. 1 in accordance with one or more aspects of the present invention.

FIG. 6 is a flow diagram illustrating various process steps that may be carried out in accordance with one or more aspects of the present invention. One or more of the process steps of FIG. 6 may be employed in one or more embodiments of the present invention to allocate a separate stack module when one of the modes or scenarios discussed hereinabove with respect to FIGS. 3, 4 and/or 5 is encountered. At action 300, the contents of the link register is preferably saved to the link register save area 258 of the current stack module, which in this example is formed at least in part by the stack frame 250. Next, the contents of the general registers are saved to the register save area 252 of the current stack module (action 302). At action 304, the contents of the local variable values are preferably saved to the local variable save area 254 of the current stack module. At this point, the stack frame 250 contains information that may be attributed to the calling function and, therefore, may be part of the existing (or current) stack module.

At action 306 a new stack module is preferably created, which stack module is preferably non-contiguous with respect to the existing stack module. At action 308, the parameters to be passed to the callee function are preferably saved to the parameter save area 256 of the new stack module. It is noted that although FIG. 2 shows the parameter save area 256 as being contiguous with the register save area 252 and the local variable save area 254, such areas may be non-contiguously stored with respect to one another. At action 310, the value of the back chain 260 is preferably set to point to the prior back chain 210 and the stack pointer is preferably set to point to the back chain 260.

As the respective stack modules may be non-contiguously located within the local memory 104, the new stack module preferably includes location information for the prior program module and the prior stack module so that this information may be retrieved when returning to the calling function from the callee function (action 312). By way of example, information concerning the address at which the prior program module is located may be stored within the back chain 260. Indeed, the back chain area 260, may be, for example, 128 bits wide, whereby a limited number of those bits may be devoted to pointing to the prior back chain 210. This leaves a significant number of bits that may be used to identify the location of the prior program within the local memory 104 and/or the prior stack module. Certain of these bits may also be allocated to identifying the stack module as being a non-contiguous stack module with respect to one or more other stack modules.

At action 314, a determination may be made as to whether the next program module to which the callee function is part is loaded within the local memory 104. When the next program module is loaded, then the program may jump to the callee function for execution.

In accordance with one or more aspects of the present invention, the prior stack module may be removed from the local memory 104 and stored in a separate memory, such as the main memory 106 in order to create more room in the local memory 104 in which to execute program code and/or store data. Indeed, the fact that the stack modules are non-contiguous permits the ability to temporarily store such modules in other places and then return them to the local memory 104 at a later time for subsequent use.

Figure 7:
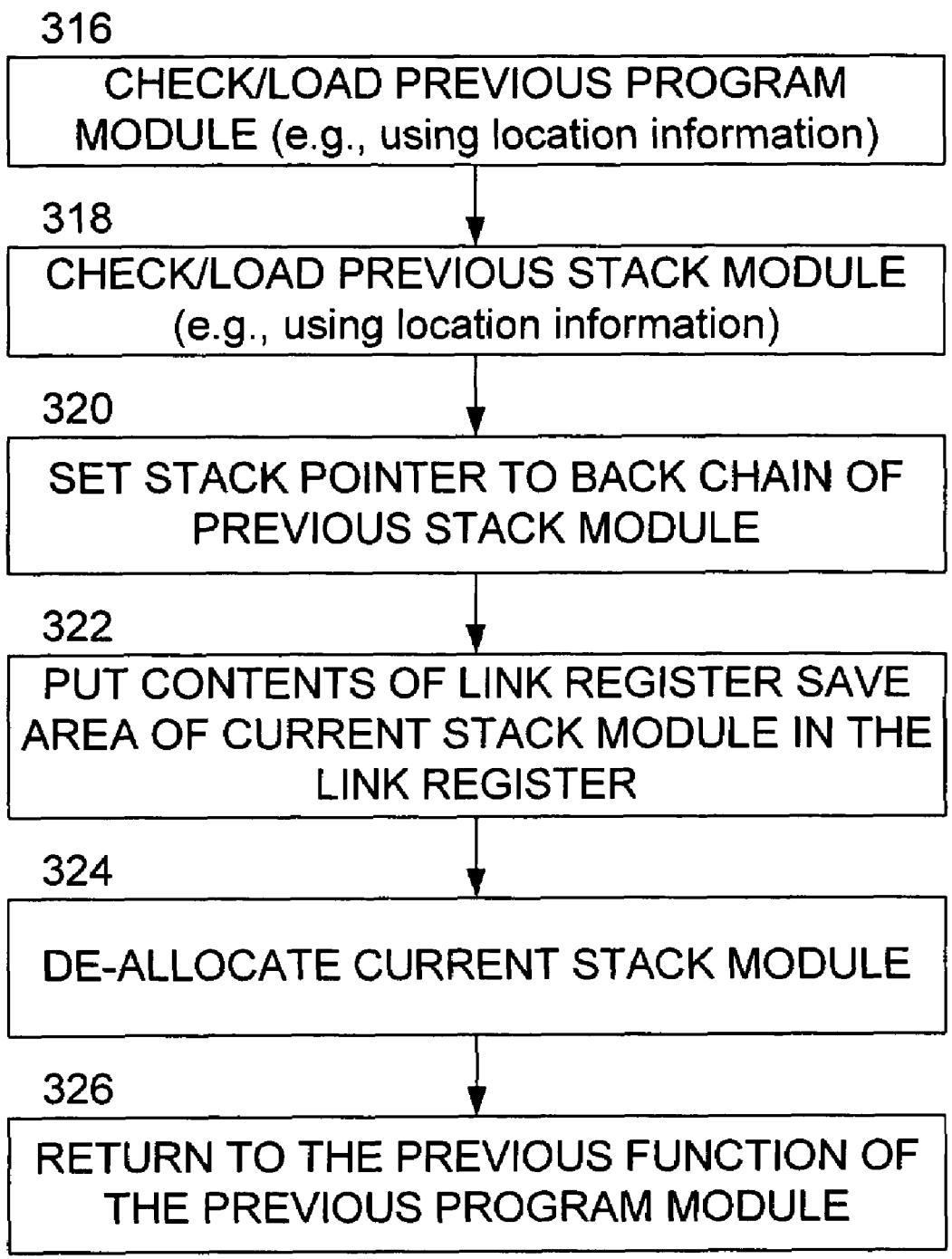
FIG. 7 is a flow diagram illustrating further process steps that may be carried out by the processing system of FIG. 1 in accordance with one or more aspects of the present invention.

FIG. 7 is a flow diagram illustrating further process steps that may be carried out by the processing system 100 in accordance with one or more further aspects of the present invention. In particular, one or more of the process steps of FIG. 7 may be carried out in order to return from the callee function to the calling function. At actions 316 and 318, determinations are preferably made as to whether the previous program module is loaded within the local memory 104 and whether the previous stack module is loaded within the local memory 104. This may be carried out by accessing the location information within the back chain area 260 of the subsequent stack module and checking such locations in the local memory 104 to determine whether the previous program module and/or the previous stack module are resident. As discussed above, the previous stack module may have been temporarily moved to the main memory 106 in order to make room in the local memory 104. Further, the previous program module may likewise have been temporarily moved to the main memory 106 for the same purpose.

In any event, when the previous program module and the previous stack module are resident within the local memory 104, the process flow preferably advances to action 320. At action 320, the stack pointer is preferably set to the back chain 210 of the previous stack module. Next, the contents of the link register save area 258 are preferably placed into the link register (action 322). The calling function may then resume. It is noted that this represents a consistent load location of the calling function or module. In an alternative embodiment, the contents of the link register save area 258 may be modified prior to placement into the link register in order to alter the load location of the calling function. In a further embodiment, the value of the link register may be modified prior to saving same in the link register save area 258 to achieve the same effect.

In accordance with one or more further aspects of the present invention, the current stack module (i.e., the stack module that was allocated in response to the calling function calling the callee function) may be de-allocated, deleted, or otherwise removed from the local memory 104 in order to free up more memory space within which to execute program and/or store data. Thereafter, the calling function may be resumed (action 326). It is noted that at this point the current program module (e.g., the callee function) is not longer in use. Thus, it may be marked as such and a determination as to whether to remove the module from the local memory 104 may be made.

Advantageously, the ability to allocate new stack modules and store same non-contiguously with respect to one or more other stack modules permits the temporary movement of such stack modules to a temporary memory area, such as within the main memory 106, in order to free up space in the local memory 104. Further, this also permits no longer useful stack modules to be deleted or otherwise removed from the local memory 104 to free up further space in the local memory 104. Conventional stack management techniques cannot achieve these desirable results.

By way of example, various aspects of the present invention may be used to achieve manage a limited stack space. Assuming that stack modules are sequentially added to a fixed stack space, when significant numbers of nested function calls are made, the stack space may be too small to accommodate all the resultant stack modules. In accordance with one aspect, one or more of the existing stack modules may be temporarily moved to another memory space (such as a system memory) to free up stack space. Further, when a stack module is no longer of use (e.g., the callee function has completed its tasks and program execution has returned to the calling function) it maybe deleted.

Figure 8:
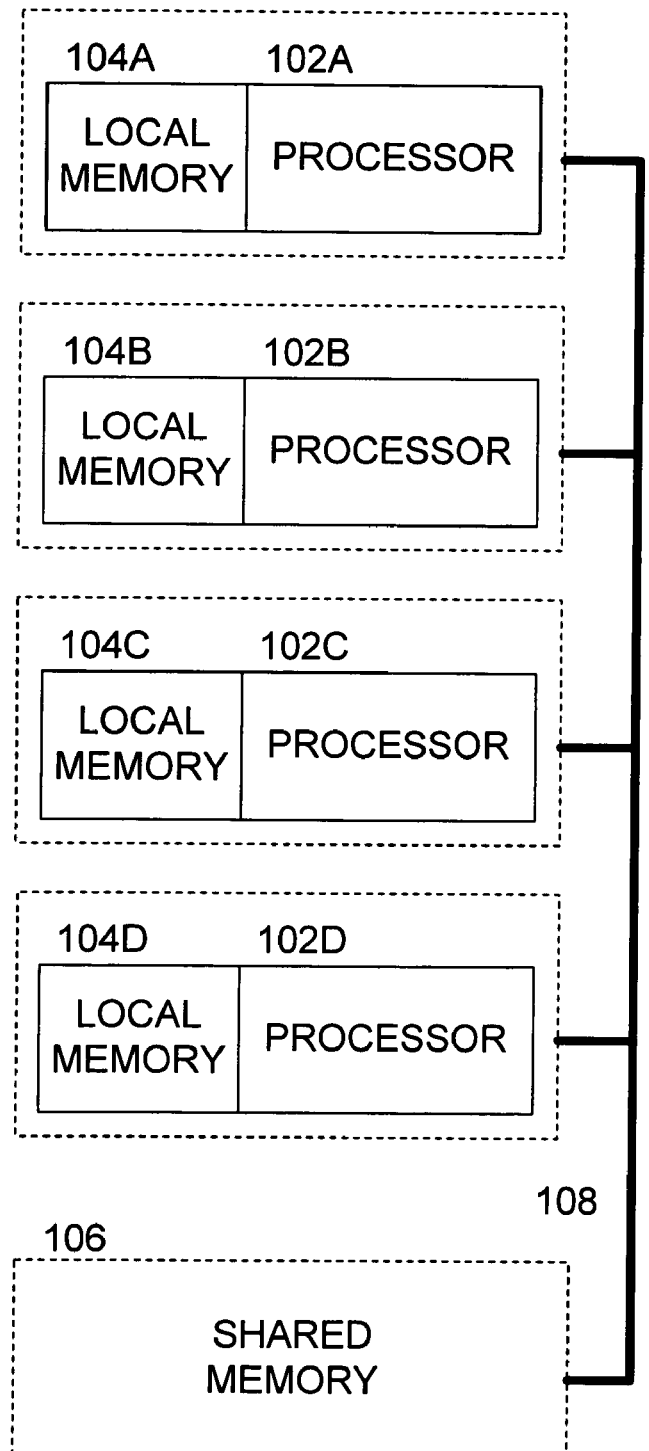
FIG. 8 is a diagram illustrating the structure of a multi-processing system having two or more sub-processors that may be adapted in accordance with one or more aspects of the present invention.

FIG. 8 illustrates a multi-processing system 100A that is adapted to implement one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 9:
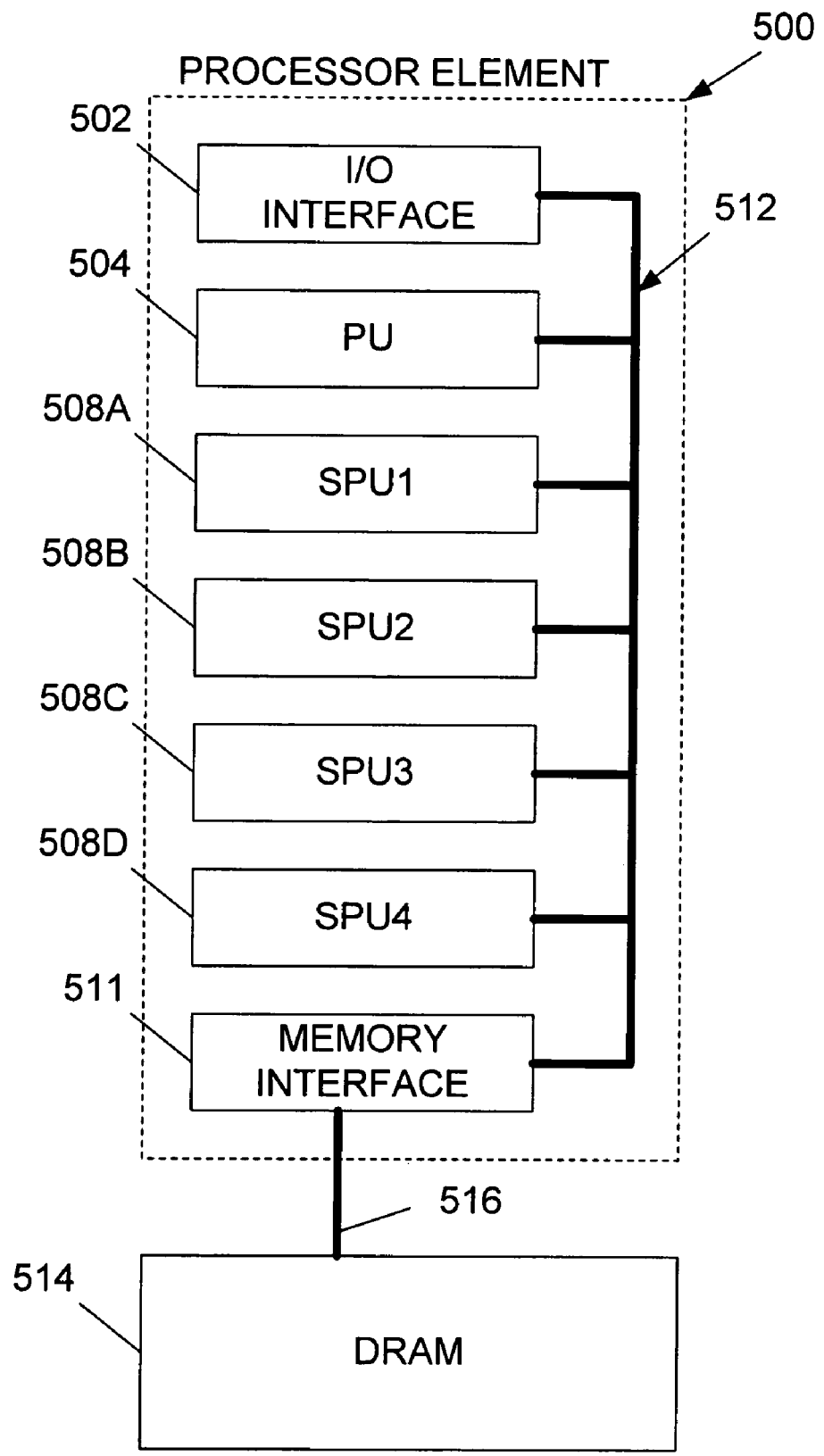
FIG. 9 is a diagram illustrating a preferred processor element (PE) that may be used to implement one or more further aspects of the present invention.

With reference to FIG. 9, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC™ core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 10:
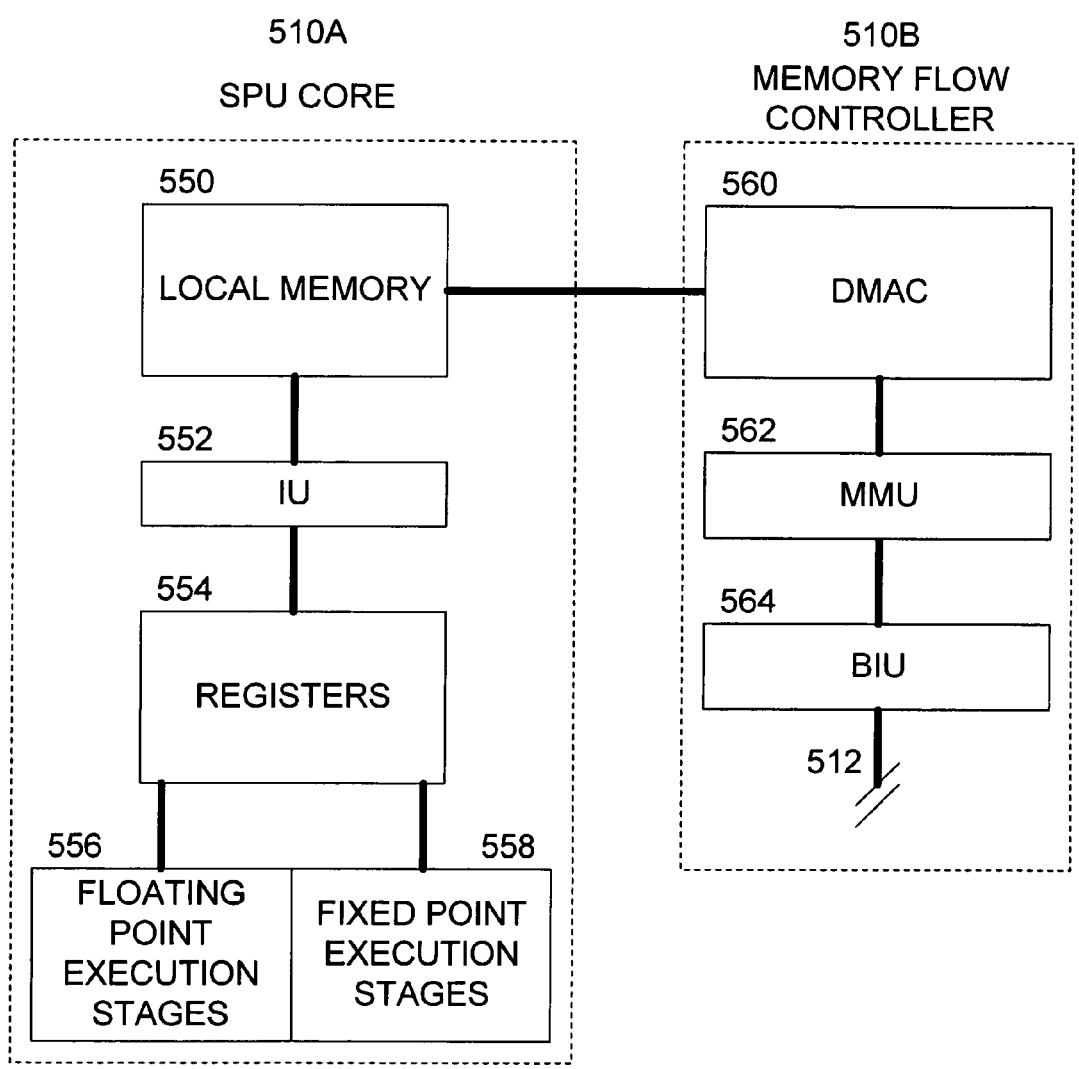
FIG. 10 is a diagram illustrating the structure of an exemplary sub-processing unit (SPU) of the system of FIG. 9 that may be adapted in accordance with one or more further aspects of the present invention.

FIG. 10 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 554 is 128×128 bits.

The SPU core 510A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

FIG. 11 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 512 and the L2 cache 582 and NCU 584 logic blocks. To this end, the BIU 580 may act as a Master as well as a Slave device on the bus 512 in order to perform fully coherent memory operations. As a Master device it may source load/store requests to the bus 512 for service on behalf of the L2 cache 582 and the NCU 584. The BIU 580 may also implement a flow control mechanism for commands which limits the total number of commands that can be sent to the bus 512. The data operations on the bus 512 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 504A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC™ technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    allocating a first stack module in one of a main memory of a processing system and a local memory of a processor of the processing system in response to a first function call of a software program running on the processor of the processing system;
    allocating a second stack module in response to a second function call of the software program if at least one condition is satisfied;
    storing the first stack module in one of the main memory and the local memory; and
    storing the second stack module in a non-contiguous relationship with respect to the first stack module in the other of the main memory and the local memory.

2. The method of claim 1, wherein the first and second stack modules contain at least one of: one or more stack frames and/or a portion of a stack frame.

3. The method of claim 1, wherein the first function call calls the second function call.

4. The method of claim 3, further comprising: allocating a non-contiguous stack module containing a single stack frame in response to each function call of the software program made by another function call.

5. The method of claim 1, wherein the at least one condition includes:
    that the first function call calls the second function call;
    that the software program includes a plurality of executable program modules;
    that the first function call is part of a first program module; and
    that the second function call is part of a second program module.

6. The method of claim 5, further comprising using the first stack module and not allocating the second stack module in response to the first function call calling the second function call when: the first and second function calls are part of the same program module.

7. The method of claim 1, further comprising: allocating the second stack module in response to the first function call calling the second function call when: the software program includes a plurality of executable program modules, the program modules are grouped into a plurality of program module sets, the first function call is part of a program module in a first program module set, and the second function call is part of a program module in a second program module set.

8. The method of claim 7, further comprising using the first stack module and not allocating the second stack module in response to the first function call calling the second function call when: the first and second function calls are part of the same program module set.

9. A method, comprising:
    allocating a first stack frame in one of a main memory of a processing system and a local memory of a processor of the processing system in response to a first function call of a software program running on the processor of the processing system;
    allocating a second stack frame in response to the first function call calling a second function call of the software program;
    dividing the second stack frame into areas for the first function call and areas for the second function call;
    storing the first stack frame in one of the main memory and the local memory; and
    storing second stack frame in a non-contiguous relationship with respect to the first stack frame in the other of the main memory and the local memory.

10. The method of claim 9, wherein the second stack frame includes at least one of: (i) a general register area operable to save one or more register values produced during the first function call, (ii) a local variable area operable to save one or more variable values produced during the first function call, (iii) a parameter list area operable to save one or more parameter values produced during the first function call for use by the second function call, (iv) a link register save area operable to save the link register value for use by the first function call in returning to a portion of the program being executed when the first function call was invoked, and (v) a back chain area operable to save a pointer to a back chain area of the first stack frame.

11. The method of claim 10, wherein the step of dividing the second stack frame includes dividing at least one of the general register area and the local variable area for the first function call from at least one of the parameter list area, the link register save area, and the back chain area for the second function call.

12. The method of claim 9, further comprising making the areas of the second stack frame for the second function call non-contiguous with respect to the areas of the second stack frame for the first function call.

13. The method of claim 12, further comprising making the areas of the second stack frame for the first function call contiguous with respect to the first stack frame.

14. A method, comprising:
allocating a first stack module in one of a main memory of a processing system and a local memory of a processor of the processing system in response to a first function call of a software program running on the processor of the processing system;
allocating a second stack module in response to the first function call calling a second function call of the software program;
storing the first stack module in one of the main memory and the local memory;
storing the second stack module in a non-contiguous relationship with respect to the first stack module in the other of the main memory and the local memory; and
deleting the second stack module in response to returning from the second function call to the first function call.

15. The method of claim 14, wherein the first and second stack modules contain at least one of: one or more stack frames and/or a portion of a stack frame.

16. A method, comprising:
allocating a first stack module in one of a main memory of a processing system and a local memory of a processor of the processing system in response to a first function call of a software program running on the processor of the processing system;
allocating a second stack module in response to the first function call calling the second function call if at least one condition is satisfied;
adding to the second stack module, return information as to the address of the first stack module in a memory of the processing system;
storing the first stack module in one of the main memory and the local memory; and
storing the second stack module in a non-contiguous relationship with respect to the first stack module in the other of the main memory and the local memory.

17. The method of claim 16, further comprising:
using the return information of the second stack module by the second function call to at least one of verify the location of and load the first stack module in the one of the main memory and the local memory; and
returning from the second function call to the first function call.

18. The method of claim 16, wherein the at least one condition includes:
that the software program includes a plurality of executable program modules;
that the first function call is part of a first program module; and
that the second function call is part of a second program module.

19. The method of claim 16, further comprising:
adding to the second stack module, return information as to the address of the first program module in the one of the main memory and the local memory; and
using the return information of the second stack module by the second function call to: (i) at least one of verify the location of, and (ii) load the first stack module in the one of the main memory and the local memory.

20. The method of claim 19, further comprising: returning from the second function call to the first function call.

21. The method of claim 20, further comprising deleting the second stack module.

22. The method of claim 16, wherein the first and second stack modules contain at least one of: one or more stack frames and/or a portion of a stack frame.

23. A storage medium containing a software program, the software program being operable to cause a processor of a processing system to execute actions including:
allocating a first stack module in one of a main memory of a processing system and a local memory of a processor of the processing system in response to a first function call of a software program running on the processor of the processing system;
allocating a second stack module in response to the first function call calling a second function call of the software program if at least one condition is satisfied;
storing the first stack module in one of the main memory and the local memory; and
storing the second stack module in a non-contiguous relationship with respect to the first stack module in the other of the main memory and the local memory.

24. The storage medium of claim 23, wherein at least one of:
the software program is operable to cause the processor of the processing system to execute further actions, including allocating a non-contiguous stack module containing a single stack frame in response to each function call of the software program made by another function call;
the at least one condition includes: that the software program includes a plurality of executable program modules, that the first function call is part of a first program module, and that the second function call is part of a second program module; and
the at least one condition includes: that the program modules are grouped into a plurality of program module sets, that the first function call is part of a program module in a first program module set, and that the second function call is part of a program module in a second program module set.

25. The storage medium of claim 23, wherein the software program is operable to cause the processor to further divide the second stack frame into areas for the first function call and areas for the second function call.

26. The storage medium of claim 25, wherein:
the second stack frame includes at least one of: (i) a general register area operable to save one or more register values produced during the first function call, (ii) a local variable area operable to save one or more variable values produced during the first function call, (iii) a parameter list area operable to save one or more parameter values produced during the first function call for use by the second function call, (iv) a link register save area operable to save the link register value for use by the first function call in returning to a portion of the program being executed when the first function call was invoked, and (v) a back chain area operable to save a pointer to a back chain area of the first stack frame; and
the software program is operable to cause the processor to further divide at least one of the general register area and the local variable area for the first function call from at least one of the parameter list area, the link register save area, and the back chain area for the second function call.

27. The storage medium of claim 23, wherein the software program is operable to cause the processor to delete the second stack module in response to returning from the second function call to the first function call.

28. The storage medium of claim 23, wherein the software program is operable to cause the processor to execute actions, including:
- adding to the second stack module, return information as to the address of the first stack module in the one of the main memory and the local memory of the processing system;
- using the return information of the second stack module by the second function call to at least one of verify the location of and load the first stack module in the one of the main memory; and the local memory; and
- returning from the second function call to the first function call.

29. The storage medium of claim 28, wherein the software program includes a plurality of executable program modules, the first function call is part of a first program module, and the second function call is part of a second program module, and the software program is operable to cause the processor to execute further actions, including at least one of:
- adding to the second stack module, return information as to the address of the first program module in the one of the main memory and the local memory;
- using the return information of the second stack module by the second function call to at least one of verify the location of and load the first stack module in the one of the main memory and the local memory;
- using the return information of the second stack module by the second function call to at least one of verify the location of and load the first program module in the one of the main memory and the local memory; and
- returning from the second function call to the first function call.

30. An apparatus, comprising:
- at least one processor capable of operative communication with a main memory; and
- a local memory coupled to the at least one processor,
- wherein the at least one processor is operable to: (i) allocate a first stack module in one of the main memory and the local memory in response to a first function call of a software program, (ii) allocate a second stack module in response to the first function call calling a second function call of the software program, and (iii) store the second stack module in a non-contiguous relationship with respect to the first stack module in the other of the main memory and the local memory.

31. The apparatus of claim 30, wherein the at least one processor is further operable to at least one of:
- add to the second stack module, return information as to the address of the first stack module in the local memory of the processing system;
- use the return information of the second stack module to at least one of verify the location of and load the first stack module in the local memory; and
- return from the second function call to the first function call.

32. The apparatus of claim 31, wherein:
- the software program includes a plurality of executable program modules, the first function call is part of a first program module, and the second function call is part of a second program module; and
- the at least one processor is further operable to at least one of: (i) add to the second stack module, return information as to the address of the first program module in the memory; (ii) use the return information of the second stack module to at least one of verify the location of and load the first stack module in the memory; (iii) use the return information of the second stack module to at least one of verify the location of and load the first program module in the memory; and (iv) return from the second function call to the first function call.

33. The apparatus of claim 30, wherein the at least one processor is further operable to delete the second stack module in response to returning from the second function call to the first function call.

34. The apparatus of claim 30, further comprising a plurality of parallel processors, the at least one processor among them, each capable of operative communication with the main memory, each of the plurality of parallel processors including a local memory that is not a hardware cache memory, and an instruction execution pipeline.

35. The apparatus of claim 34, wherein each of the plurality of parallel processors is capable of executing the software program when the software program is stored within its local memory, but each parallel processor is not capable of executing the software program when stored within the main memory.

36. The apparatus of claim 34, wherein each of the plurality of parallel processors and associated local memories are disposed on a common semiconductor substrate.

37. The apparatus of claim 34, wherein, each of the plurality of parallel processors, associated local memories, and the main memory are disposed on a common semiconductor substrate.

38. A method, comprising:
- allocating a first stack module in one of a main memory of a processing system and a local memory of a processor of the processing system in response to a first function call of a software program running on the processor of the processing system; and
- allocating a second stack module in response to a second function call of the software program,
- wherein the second stack module is stored in one of the main memory and the local memory in a non-contiguous relationship with respect to the first stack module, which is stored in the other of the main memory and the local memory, the first function call calls the second function call, and the first and second stack modules contain a single stack frame.

* * * * *